May 17, 1932. G. C. GEORGE 1,858,493
FLUID PRESSURE BRAKE RETAINER VALVE MECHANISM
Filed March 5, 1929
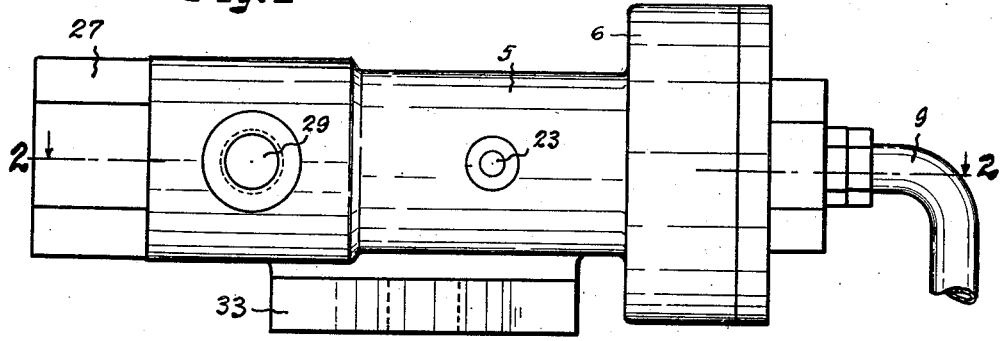
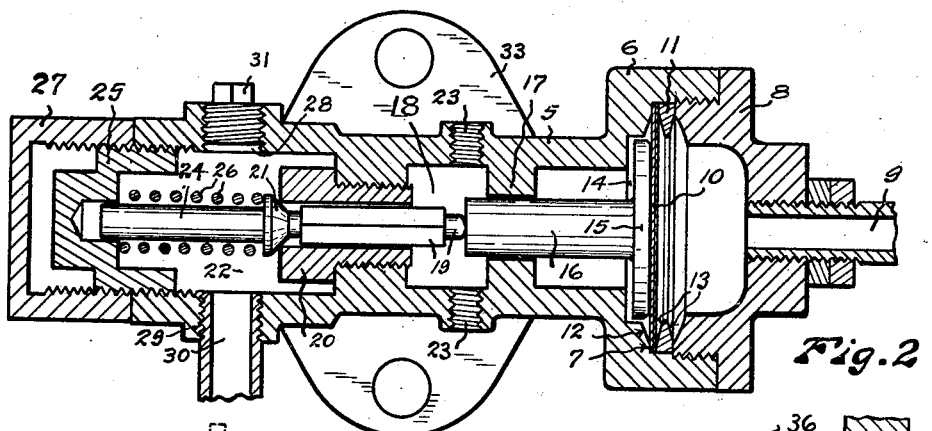
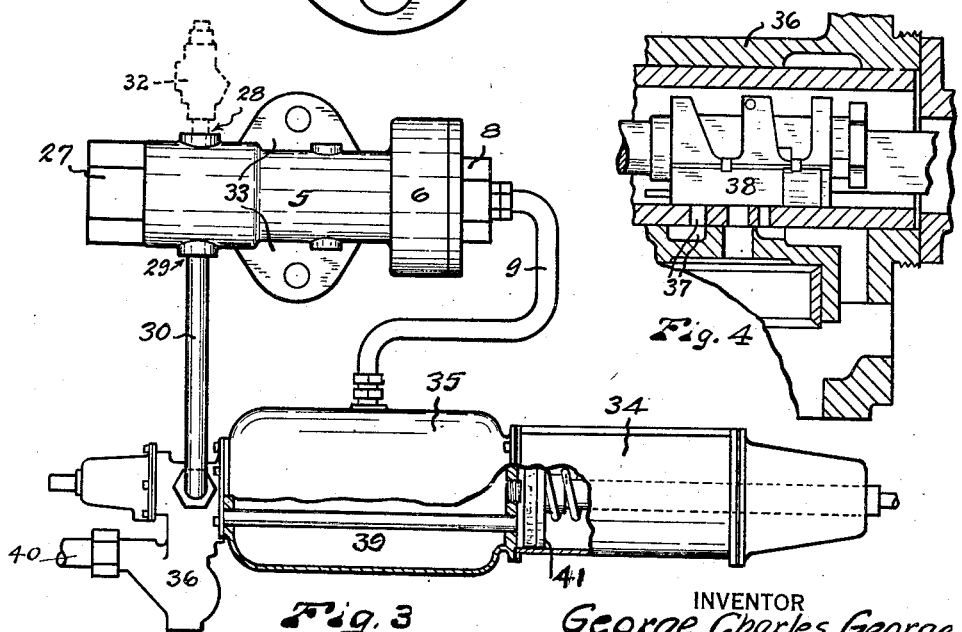
INVENTOR
George Charles George
BY
G. Wright Arnold
ATTORNEY Patented May 17, 1932

1,858,493

UNITED STATES PATENT OFFICE

GEORGE CHARLES GEORGE, OF SEATTLE, WASHINGTON, ASSIGNOR TO J. R. DODSON, OF PORTLAND, OREGON

FLUID PRESSURE BRAKE RETAINER VALVE MECHANISM

Application filed March 5, 1929. Serial No. 344,188.

My invention relates to a brake retainer mechanism and method of maintaining the brakes of a train in applied position, and is in the nature of an improvement on the brake retainer valve mechanism disclosed in Patent No. 1,582,539, issued to Sabert A. Richardson, April 27, 1926.

The primary object of my present invention is to provide air brake mechanism in which the retainer valve is automatically controlled by the air pressure within the auxiliary reservoir of the brake mechanism or a reservoir subject to train line pressure control, thereby making it possible to dispense with the extra air line identified in said patent by the reference 26 which is used in the Richardson device to which reference has been made hereinabove, and at the same time affording a fully automatic control which is substantially fool proof.

A further object is to provide brake control mechanism of this nature in which the air is automatically held within the brake cylinder until the auxiliary reservoir is fully charged up to its normal working pressure or to a predetermined pressure and is then released automatically, thus making it impossible for the engineer to release the brakes until there is adequate pressure in the auxiliary reservoir to immediately reset the same in case it is necessary to do so.

Another object is to provide retainer valve means which will operate as an automatic continuous retainer when the pressure carried in the train service pipe is not enough to develop sufficient pressure in the auxiliary reservoir to open the retainer valve and which will operate as an automatic intermittent retainer when the pressure carried in the train service pipe is sufficient or more than sufficient to open the valve.

A further primary purpose of my invention is to operate a fluid pressure brake retainer valve by actuating one end of said retainer valve and subjecting it to a charging source of fluid pressure disposed locally as respects the particular car, said pressure being subject to train line pressure control, to the end that the air from the brake cylinders cannot be released thru said retainer valve until a charge of fluid pressure is supplied locally to the car of a predetermined magnitude, that is of a magnitude sufficient to immediately reset the brakes if so desired.

A further primary object of my invention is to provide a brake mechanism which will eliminate the difficulty arising by reason of the unequal distances of piston travel which occur on the part of the piston of the brake cylinders of different cars.

For purposes of illustration and clearness and definiteness of description, my invention will be set forth in conjunction with the brake mechanism commonly obtaining on freight cars but it is to be distinctly understood that it is applicable to the brake mechanism commonly obtaining on passenger cars, which for example, ordinarily have besides the auxiliary reservoir, other reservoirs commonly known as service and emergency reservoirs respectively, but all being subject to train line pressure control, i. e., resembling in this feature the auxiliary reservoir.

In the operation of trains on long steep grades, a continuous (also referred to as "positive") or frequently repeated intermittent application of the air brakes is often required to keep the train under control and prevent runaways and wrecks with consequent loss of life, personal injury, and property damage, as frequently happens with logging trains, exceedingly heavily loaded with large logs, on long mountain grades. The usual air brake equipment is not always adequate to meet the requirements of heavy trains on some of the longer and steeper grades, especially when it is not skillfully and efficiently handled by the engineer. If the brakes are applied continuously, the air pressure in the brake cylinder and auxiliary reservoir will gradually leak out until it is not sufficient to maintain the brakes efficiently in applied position, it being understood that while the brakes are applied the auxiliary reservoir is not permitted to recharge. The continuous application of the brakes for too long a period of time is often further objectionable because it tends to heat up the brake shoes and the car wheels. For these and other reasons it is common practice on long steep grades to apply and release the brakes intermittently, the brakes being applied long enough to check the speed of the train, then released for a short period of time and then applied again. This tends to rapidly reduce the air pressure in the auxiliary reservoirs due, first, to the fact that the air pressure in the brake cylinders exhausts to the atmosphere each time the brakes are released and, second, to the fact that the time between successive applications of the brakes is not sufficient to allow the auxiliary reservoirs to be fully recharged to their normal pressure. The result is that the pressure in the auxiliary reservoirs is lowered by each successive application and release of the brakes until it is not sufficient to apply the brakes with enough force to hold the train, and the train runs away. The time required for recharging the auxiliary reservoirs varies, depending on the number of cars in the train and the degree to which the auxiliary tanks are exhausted. From three to five minutes may be required to recharge the auxiliary tanks on an ordinary train of fifteen cars. The objectionable conditions hereinbefore described are especially liable to prevail on logging railroads but may be encountered wherever trains are operated on grades.

To overcome the shortcomings of the ordinary brake system as above described there has been an attempt to remedy the same by providing what is known as a retainer valve which is applied to the exhaust port of the triple valve, whereby the air upon exhausting from the brake cylinder is arrested in its escape and therefore retains the brakes in applied position with the feeble pressure so long as any pressure remains in said cylinder, but of course with decreasing effectiveness. These valves are manually operated. On a very long train an operator starts out from each end of the train to move these valves on each car into closed position on the beginning of the descent. These valves operate to hold the brakes in applied position so that after they are once set, the setting is continued for a period until the pressure in the brake cylinders is exhausted. In the meantime, the engineer re-supplies the auxiliary reservoirs. The descent may involve several downgrades and with some upgrades or level stretches. When the descent for a particular grade is accomplished or an ascent or even a level stretch is made, the operators start out anew from each end of the train and move the said retainer valves into open position. Manifestly, any such practice is expensive, slow and cumbersome. During the total descent the said retainer valves must often be operated two or more times. This involves a loss of time and labor and is not satisfactory nor fully efficient.

Devices embodying separate and independent air lines to operate the retainer valve mechanism are objectionable in that they require extra and specially provided equipment departing by so much from the standard and introducing the hazard of an extra air line. In accordance with my present invention I provide a retainer valve which is directly connected with the auxiliary air reservoir and triple valve of regular standard equipment in such a manner that the air pressure within the auxiliary reservoir automatically controls the exhaust of air from the brake cylinder and makes it impossible to completely release the brakes until the auxiliary reservoirs are safely charged up to the pressure they are intended to carry. Thus I employ no special and extra pressure line paralleling the regular train line. My retainer valve is further provided with tension spring means which may be adjusted so that the retainer valve will release automatically after the auxiliary reservoir is safely charged up to its normal or predetermined pressure and which may be varied to suit different requirements as to working pressure of the auxiliary reservoirs.

The above mentioned general objects of my invention, together with others inherent in the same, are attained by the mechanism, illustrated in the following drawings, the same being a preferred exemplary form of embodiment of my invention, throughout which drawings like reference numerals indicate like parts:

Figure 1 is a side elevation of a retainer valve constructed in accordance with my invention;

Fig. 2 is a sectional view of the same substantially on section line 2, 2 of Fig. 1;

Fig. 3 is a plan view on a smaller scale showing my retainer valve installed in connection with a triple valve, auxiliary reservoir and brake cylinder of standard construction, parts being broken away to reveal interior constructions; and Fig. 4 is a fragmentary sectional view showing parts of the triple valve with which my retainer valve is connected.

My retainer valve comprises a housing 5, provided at one end with an enlarged portion 6 which is counterbored to form an annular shoulder 7 and is internally threaded for the reception of a cap member 8 which is connected with a pressure inlet pipe 9. A flexible diaphragm 10 is supported on the shoulder 7 and is held in place by a washer 11 against which the end of the cap member 8 presses. The shoulder 7 is preferably beveled as at 12 to allow greater freedom of movement of the flexible diaphragm and the washer 11 is similarly beveled as at 13, preferably on both sides to make said washer reversible. The flexible diaphragm 10 may be composed of two discs of thin flexible metal as shown in Fig. 2, it being obvious that one or more discs may be used, as desired. The cap 8 is recessed, as shown, to afford a pressure chamber on one side of the diaphragm. On the other side of the diaphragm a chamber 14 is formed in the valve housing for the reception of a disc like head 15 on a valve operating plunger 16. The head 15 has a limited movement and affords a support and stop for the central portion of the diaphragm 10 thereby preventing damage to the same. The valve operating plunger 16 extends axially of the valve housing through a guide portion 17 and into an exhaust chamber 18 where it abuts against the end of a valve stem 19. The valve stem 19 is guided within a fitting 20 and is provided with a valve 21, disposed within a valve chamber 22 and arranged to seat against the end of the fitting 20. That portion of the valve stem 19 which extends through the fitting 20 is of square cross section, as shown, or is otherwise shaped so that air may pass freely through the fitting. The exhaust chamber 18 has outlet openings 23, to the atmosphere, which may be internally threaded so that one or more of the same may be plugged if desired.

A guide stem 24 protrudes from the rear side of the valve 21 and is slidable within a plug 25 which screws into the end of the housing 5. A compression spring 26 on the guide stem 24 abuts against the plug 25 and the valve 21 and yieldingly holds said valve against the valve seat. A cap 27 screws onto the plug 25 and abuts against the end of the housing thereby serving as a cover for the plug 25 and as a lock nut to retain said plug in adjusted position. Two internally threaded openings 28 and 29 are preferably provided in the walls of the housing 5 to communicate with the valve chamber 22, one of said openings being connected with an air conduit pipe 30, and the other of said openings either being closed by a plug 31, as shown in Fig. 2, or being connected with a retainer or as is commonly termed "blow-down" valve 32 of standard construction, as shown in Fig. 3. Suitable base flanges 33 are provided on the housing 5 to adapt the same to be mounted on any available support.

In connecting my retainer valve with air brake mechanism embodying a brake cylinder 34, an auxiliary air reservoir 35, and a tripple valve 36, all of well known standardized construction and not specifically described therein, the pipe 9 is connected with the auxiliary air reservoir 35, and the pipe 30 is connected with the exhaust opening or port 37, Fig. 4, of the triple valve 36, said exhaust port 37 being arranged to be connected by slide valve mechanism 38 of well known form with a pipe 39 which extends through the auxiliary reservoir 35 to the brake cylinder 34. The slide valve 38 is also capable, when moved into what is known as the service position, of connecting the pipe 39 with the auxiliary reservoir 35 to permit air from the auxiliary reservoir to pass to the brake cylinder and set the brakes.

In the operation of this brake mechanism when the brakes are to be set, the engineer reduces or releases the pressure in a train line or brake service pipe 40 connected with the triple valve. This moves the slide valve 38 and connects the auxiliary reservoir 35 with the brake cylinder, admitting air under pressure from the auxiliary reservoir and applying the brakes. As long as the pressure in the pipe 40 is less than the pressure in the auxiliary reservoir the brakes will remain set but their effectiveness will be gradually reduced by leakage of air, and as long as the slide valve 38 remains in the service position it is impossible to recharge the auxiliary reservoir 35. To release the brakes and recharge the auxiliary reservoir pressure is admitted to the pipe 40. This moves the slide valve 38 to charging position, changing the connections as follows: Communication between the pipe 39 and the auxiliary reservoir 35 is shut off and the pipe 39 is connected with the triple valve exhaust port 37 allowing the pressure in the brake cylinder to exhaust; communication is also established between the train line or service pipe 40 and the auxiliary reservoir 35 allowing the auxiliary reservoir to be recharged to the required pressure. It is now common practice to allow the compressed air from the brake cylinder to exhaust into the atmosphere, thus fully releasing the brakes before the auxiliary reservoir has had time to become safely charged. This is impossible with a device embodying my invention. Where the brakes are re-applied immediately after they are released and this procedure is repeated several times, the auxiliary reservoir pressure may be reduced to such an extent that it will not apply the brakes with sufficient force to hold the train. When my retainer valve is connected by the pipe 30 with the exhaust port 37 of the triple valve 36 and by the pipe 9 with the auxiliary reservoir 35, then the air from the brake cylinder must exhaust through the retainer valve past the valve member 20 and the valve member 21 of said retainer valve will always be held in closed position by the spring 26 until such time as the auxiliary reservoir 35 has been charged up to its predetermined normal pressure and exerts sufficient pressure against the diaphragm 10 to overcome the pressure of the tension spring 26 and open the valve 21 and allow the air from the brake cylinder to exhaust past said valve 21 and escape through the openings 23. The release of the brakes is thus automatically controlled by the pressure within the auxiliary reservoir or a reservoir subject to train line pressure control, it being impossible to release said brakes until the auxiliary reservoir pressure is sufficient to overcome the pressure of the spring 25 set to exert a pressure of a predetermined magnitude and open the valve 21. The magnitude of the spring pressure is adjusted to be such as to insure a safe recharge pressure in the reservoir subject to train line pressure control, such as the auxiliary reservoir.

The pressure which is carried in the train line or brake service pipe 40 is under the control of the engineer. If this pressure is less than enough to overcome the compression of the spring 26 then my valve operates as an automatic continuous retainer which will prevent the exhaust of pressure from the brake cylinder as long as the low service or low train line pipe pressure is carried. If the pressure carried in the service or train line pipe 40 is sufficient or more than sufficient to overcome the pressure of the spring 26 the valve operates as an automatic intermittent retainer, holding the brakes set until the auxiliary reservoirs are charged up to the required working pressure and automatically releasing said brakes as soon as said reservoirs are thus safely charged up. This makes it impossible for the engineer to release his brakes unless he has sufficient pressure in his auxiliary reservoirs to properly reset said brakes. This arrangement positively insures against a releasing of the brakes until there is a brake resetting charge built up locally of sufficient amount to immediately reset the brakes if desirable.

Ordinarily the brake cylinder piston 41 travel distance is approximately eight inches. However, owing to the provision of worn brake shoes or other reasons, the piston 41 travel distance may be greater, or owing to poor adjustment, the piston 41 travel distance may be less than eight inches. In the first instance obviously the brakes will not be set with the desired brake pressure, which for purposes of illustration has been herein assumed to be eight inches, and in the other instance the pressure with which the brakes will be applied will be much greater than the calculated amount. Assuming that the normal pressure is supplied to the brake cylinders of the various cars and some of the pistons 41, for reasons above stated travel more than the stated eight inches, while others travel less, and assuming that shortly thereafter another ten pounds of pressure is admitted to the brake cylinders by the engineer, the results will be, in the mechanism embodying my invention in the instance of those cylinders which have traveled a greater distance than eight inches, that they will receive the effect of the newly admitted ten pounds of pressure so that they will more nearly develop the desired braking effect and thus cause the car to slow down at a rate corresponding to that of the car whose brake cylinder piston has moved only the calculated distance.

When it is stated that another ten pounds of pressure is admitted to the brake cylinder by the engineer, it is meant that the engineer moves the brake valve into "service application", that is, he reduces the normal pressure of seventy pounds in the train line below the pressure in the auxiliary reservoir which likewise is normally seventy pounds. This reduction two or three times ordinarily is sufficient to bring about a practical equalization of the various pressures on the brake valves, that is approximating seventy pounds. It should be remembered that successive applications are only necessary to build up the pressure to equalization point in those instances where the piston travel is greater than the standard eight inches, since it will be understood that the auxiliary reservoir, in the other instances of where the piston travel distance is shorter, is already built up to its seventy pounds pressure and to its practical equalization point, that is, the equalization point is reached between it and its brake cylinder. Thus, by means of these successive applications the practical equalization point is provided for all the cars, regardless of their difference in piston travel. This is made possible by reason of the fact that the retainer valve mechanism embodying my invention retains the pressure of the brake cylinders during the time when the engineer is recharging the auxiliary reservoir. Thus, the mechanism embodying my invention provides for the highly advantageous result that all the brake cylinder pressures, regardless of different piston travel, are rendered equal. In the instance of those pistons which have not traveled the calculated piston distance the brakes will already be applied with a pressure greater than desired, with the result that the particular car will be dragging in comparison with the other cars. It will be understood that the brakes will be applied with a greater pressure when the piston does not travel its full calculated distance. Hence, when the second charge of pressure is applied as above assumed, it will have practically no effect in those cylinders where the pressure already is excessively great by reason of the short piston travel as just explained.

By providing for the supplying of fluid pressure to the brake cylinders without permitting the release thereof until a pressure of a sufficient magnitude is established in the auxiliary cylinder which will be capable of resetting the brakes, it is obvious that the device embodying my invention overcomes the difficulties arising by reason of the unequal travel distance of the brake cylinder pistons in the cylinders of the various cars. The admission of the second charge of air obviously builds up the pressure in those particular cylinders where the travel distance has been greater than the calculated eight inches so that an effective brake pressure is developed for that particular car, while in those cars having already a sufficiently large brake pressure by reason of the piston not traveling its calculated distance, then as respects that cylinder, the second application of fluid presure will have no effect for the reason that the pressure in the brake cylinder will already be equal to that to which the second charge was necessary to develop in those cylinders where the piston travel was greater than the calculated eight inches.

In some instances it may be desirable to use an ordinary retainer valve 32 of well known form connected in the manner shown in Fig. 3. When this is done this standard retainer valve may be manually opened to permit the pressure from the brake cylinder 34 to exhaust freely to the atmosphere.

I have disclosed my automatic retainer valve as being a separate unit adapted for connection with a standard type of triple valve and auxiliary reservoir, but it will be understood that the same may be incorporated into the construction of the triple valve if desired, without departing from the spirit of my invention.

Obviously, changes may be made in the form, dimension, and arrangement of the parts of my invention, without departing from the principle thereof, the above setting forth only a preferred form of embodiment.

I claim:

1. In a fluid pressure brake retainer valve mechanism the combination with an auxiliary reservoir and triple valve, of a retainer valve casing connected to said triple valve and auxiliary reservoir, a retainer valve in said casing, a pressure device in the casing, exposed to the pressure in the auxiliary reservoir, a single spring acting against both said valve and said pressure device, the connection between said casing and said triple valve being at the side of the casing, and a screw plug in the end of the retainer valve casing, bearing against the spring, and adjustable to vary the tension of the spring without disconnecting the connections between the casing and the triple valve and auxiliary reservoir.

2. The combination stated in claim 1, and a cap screwed on the end of the plug and against the end of the casing to lock the plug at adjustment and enclose the end of the plug.

3. In a fluid pressure brake retainer valve mechanism the combination with an auxiliary reservoir and triple valve, of a retainer valve casing connected to said triple valve and auxiliary reservoir, a retainer valve in said casing, a pressure device in the casing, exposed to the pressure in the auxiliary reservoir, a single spring acting against both said valve and said pressure device, and a screw plug in the end of the retainer valve casing, bearing against the spring, and adjustable to vary the tension of the spring without disconnecting the connections between the casing and the triple valve and auxiliary reservoir.

4. Means for securing uniformity of action of all the brakes of a train of cars employing an air brake system, comprising the combination with the brake cylinder, auxiliary reservoir and triple valve of each car, of a retainer valve casing connected to each triple valve and auxiliary reservoir, a retainer valve in each casing, a pressure device in each casing exposed to the pressure in the auxiliary reservoir, and a single spring acting against both the said valve and said pressure device, the springs of the various valves being independently adjustable to retain and only retain the pressure in the brake cylinders of the respective cars until the auxiliary reservoir of each car is charged to the same predetermined operating pressure.

5. Means for securing uniformity of action of all the brakes of a train of cars employing an air brake system, comprising the combination with the brake cylinders, auxiliary reservoirs and triple valves of all the cars, of a retainer valve mechanism connected to each of said reservoirs and triple valves, said mechanism including a retainer valve, and a single adjustable spring tending to hold said valve closed, each of said springs being adjusted to retain and only retain the pressure in the particular brake cylinder with which it is associated, according to the local conditions therein, until the particular auxiliary reservoir with which it is associated is charged to the same predetermined pressure as the other auxiliary reservoirs in the system.

6. The means stated in claim 5, said spring being exteriorly adjustable without disconnecting the connections between the retainer valve mechanism and the triple valve and auxiliary reservoirs.

In witness whereof, I hereunto subscribe my name this 21 day of February, 1929.

GEORGE CHARLES GEORGE.